(12) United States Patent
Giamba

(10) Patent No.: US 12,352,445 B2
(45) Date of Patent: Jul. 8, 2025

(54) EXTERIOR WOOD BURNING GRILL

(71) Applicant: Fragia LLC, Stamford, CT (US)

(72) Inventor: Rafael J. Giamba, Stamford, CT (US)

(73) Assignee: Fragia LLC, Stamford, CT (US)

( * ) Notice: Subject to any disclaimer, the term of this patent is extended or adjusted under 35 U.S.C. 154(b) by 426 days.

(21) Appl. No.: 18/066,560

(22) Filed: Dec. 15, 2022

(65) Prior Publication Data

US 2023/0184440 A1 Jun. 15, 2023

Related U.S. Application Data

(60) Provisional application No. 63/265,460, filed on Dec. 15, 2021.

(51) Int. Cl.
| | |
|---|---|
| *F24B 1/20* | (2006.01) |
| *A47J 37/07* | (2006.01) |
| *F24B 13/02* | (2006.01) |
| *F24C 15/08* | (2006.01) |

(52) U.S. Cl.
CPC ........... *F24B 1/207* (2013.01); *A47J 37/0704* (2013.01); *A47J 37/079* (2013.01); *F24B 13/02* (2013.01); *F24C 15/08* (2013.01); *A47J 2037/0795* (2013.01)

(58) Field of Classification Search
CPC ........ F24B 13/02; F24B 1/207; F24B 15/005; A47J 37/0731; A47J 37/0786; A47J 37/0763; A47J 37/0704; A47J 37/079; A47J 2037/0777; A47J 2037/0795; F24C 15/08
See application file for complete search history.

(56) References Cited

U.S. PATENT DOCUMENTS

| | | | | |
|---|---|---|---|---|
| 1,853,319 | A | * | 4/1932 | Polhemus ........... A47J 37/0704 99/421 H |
| 2,691,368 | A | * | 10/1954 | Hood .................. A47J 37/0754 99/427 |
| 4,462,306 | A | * | 7/1984 | Eisendrath ............ A47J 37/067 15/236.01 |
| 2009/0151575 | A1 | * | 6/2009 | Eisendrath ............ A47J 37/041 99/421 H |
| 2019/0231144 | A1 | * | 8/2019 | Cook .................. A47J 37/0704 |
| 2020/0297161 | A1 | * | 9/2020 | Ebbes ................. A47J 37/0786 |
| 2022/0175187 | A1 | * | 6/2022 | Garces ................ A47J 37/0759 |
| 2022/0248904 | A1 | * | 8/2022 | Carballo ............. A47J 37/0786 |

* cited by examiner

*Primary Examiner* — Alfred Basichas
(74) *Attorney, Agent, or Firm* — Husch Blackwell LLP

(57) ABSTRACT

A grill system having a housing, a frame, movably imbedded inside the housing through a top of the housing, a grate covering a top of the frame, a wheel adjacent to a side of the housing, connected to a wheel shaft, parallel to the grate and connected to the frame, a lock securing the wheel in set positions, and a heat source inside the frame below the grate and above the wheel shaft. The wheel and wheel shaft being rotatable such that the frame and the grate are raised or lowered out of or into the housing as the wheel and wheel shaft rotate. The heat source is movable independent from the wheel, wheel shaft, frame, and grate, and the grate cannot be lowered below the heat source.

19 Claims, 18 Drawing Sheets

EXTERIOR WOOD BURNING GRILL

CROSS-REFERENCE TO RELATED APPLICATIONS

This patent application claims the benefit, under 35 U.S.C. § 119(e), of U.S. Provisional Application Ser. No. 63/265,460, filed on Dec. 15, 2021 the contents of which are incorporated herein by reference in its entirety.

TECHNICAL FIELD

The present teachings herein generally relate to grills. More particularly, the present disclosure relates to wood burning grills with an adjustable grill grate that may be raised or lowered. The present disclosure also relates to a detachable charcoal starter for use with the wood burning grill.

BACKGROUND

The benefits of grilling meat and other food over an open fire are well known. Grilling food over an open fire provides improved flavor over other forms of cooking in many cases imparting unique flavors depending on the fuel being burned. However, the heat and flames from an open wood fire can be difficult to control. Unlike a gas or electric grill, the fuel source of a wood fire cannot be easily manipulated to reduce the heat.

Known grills available on the market either have a stationary grill top or an adjustable grill top. Known grills suffer from not being able to easily adjust the cooking temperature of the food being cooked and/or are overly large and cumbersome including a large hanging adjustable grill top over the grill.

The temperature of a grill with a stationary grill top is typically adjusted by varying the amount of fuel supplied to the grill. This is easily done with gas and electric grills by, for example, turning a knob to increase or decrease the flow of gas or the power of the burner. However, varying the fuel source of a wood burning grill requires removing hot burning coals from under the grill top or adding new wood/coals. Removing hot burning coals is dangerous and the coals are often not accessible without removing the grill top. Removing the grill top may not be possible while the grill is in use. Adding new wood to raise the temperature is similarly difficult. It takes time for newly added wood to burn and turn into charcoal producing the most heat. Knowing how and when the temperature will vary depending on the amount of fuel added or removed requires a high level of expertise and may be difficult for in experienced chefs/grill masters.

On grills with a stationary grill top, users may vary the cooking temperature by moving the food being cooked to different areas on the grill, resulting in non-uniform cooking. Multiple pieces of food receive different levels of heat and cook at different speeds making it difficult to manage a large grill of food.

In the case of adjustable grill tops, the variable heat problem is solved by raising or lowering the grill closer or further away from the heat source. This way the food may receive a varying level of heat without changing or adjusting the hot coals. This also allows for the heat to be uniformly adjusted for the entire grill.

Grills with adjustable tops known in the art may utilize a hanging or suspended grill grate attached to a truss system overhanging the grill. This way the grill grate may be pulled away or lowered over the heat source. Such a truss system may limit access to the grill top from the back or sides of the grill. Hanging or suspended grill grates may also present instability issues as compared to stationary grill tops.

Additionally, the adjustable grill top may be attached to chains or wires and lowered or raised from above, requiring a permanent installation on a nearby structure or the grill itself. Thereby limiting or eliminating the portability of such grills.

Known adjustable grills utilize a wheel and pulley system for adjusting the grill height. The wheel and pulley system is placed above the grill. Since heat rises, these wheels can become hot and may become dangerous to operate while the grill is in use. Furthermore, shorter users may not be able to reach the wheel or may have difficulty turning the wheel.

Furthermore, known wood burning grills utilize wood and charcoal starters to alleviate variability when adding new fuel. However, these wood and charcoal starters are often small and are not suited for maintaining a commercial size grill. When operating a large grill or multiple grills, it may be desirable to have a portable wood and charcoal starter constantly running with fuel ready to be removed and added to the grill. A larger portable wood and charcoal starter allows for new fuel and activated fuel to be easily cycled at any location.

Thus, there is a need for an improved grill. According to the present teachings, such a grill may have an adjustable grill grate that is contained within the grill housing, stable, may be adjusted by a mechanism that is low to the ground and away from the heat source, and may allow for a detachable wood or charcoal starter.

SUMMARY

The needs set forth herein as well as further and other needs and advantages are addressed by the present embodiments, which illustrate solutions and advantages described below.

It is an object of the present teachings to remedy the above drawbacks and shortcomings associated with known grills.

It is an object of the present teachings to provide a grill which may vary the cooking temperature of food by raising and lowering the cooking surface.

It is an object of the present teachings to provide a grill with an adjustable cooking surface that may have an internal suspension.

It is an object of the present teachings to provide a grill that may be portable and easily moved to both outdoor and indoor locations.

It is an object of the present teachings to provide a grill with an adjustable grill grate that may be adjusted by a wheel or other mechanism which is easily reachable from any height.

It is an object of the present teachings to provide a grill which may be side and/or top loaded with fuel and may have a detachable fuel starter.

These and other objects of the present teachings may be achieved by providing a grill system comprising a housing having an open top, a frame inside of the housing, a housing having an open top, a frame inside of the housing, a shaft rotatably attached to the housing and at least partially inside of the frame, the mechanism being connected to the frame, and a handle adjacent to a side of the housing connected to the shaft. The shaft and the handle move the frame vertically without moving the housing.

These and other objects of the present teachings may also be achieved by providing a grill having a grill housing, a frame, movably imbedded inside the grill housing through a top of the grill housing, a grate covering a top of the frame, a wheel attached to a side of the grill housing, connected to a wheel shaft, the wheel shaft being parallel to the grate and disposed inside of and connected to the frame, a lock releasably securing the wheel in set positions, and a heat source disposed inside the frame below the grate and above the wheel shaft, the wheel and wheel shaft being rotatable in a first direction and a second direction, such that when the wheel and the wheel shaft are rotated in the first direction, the frame and the grate are raised out of the grill housing, and wherein when the wheel and wheel shaft are rotated in a second direction, the frame and the grate are lowered into the grill housing, wherein the heat source is movable independent from the wheel, wheel shaft, frame, and grate, and wherein the grate cannot be lowered below the heat source.

DETAILED DESCRIPTION

The present teachings are described more fully hereinafter with reference to the accompanying drawings, in which the present embodiments are shown. The following description is presented for illustrative purposes only, and the present teachings should not be limited to these embodiments.

The present teachings have been described in language more or less specific as to structural and mechanical features. It is to be understood, however, that the present teachings are not limited to the specific features shown and described, since the device, apparatus, and/or system herein disclosed comprises preferred forms of putting the present teachings into effect.

For purposes of explanation and not limitation, specific details are set forth such as particular structures, architectures, interfaces, techniques, etc. in order to provide a thorough understanding. In other instances, detailed descriptions of well-known devices and/or methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first," "second," etc. for different features/components of the present disclosure are only intended to distinguish the features/components from other similar features/components and not to impart any order or hierarchy to the features/components.

Figure 1:
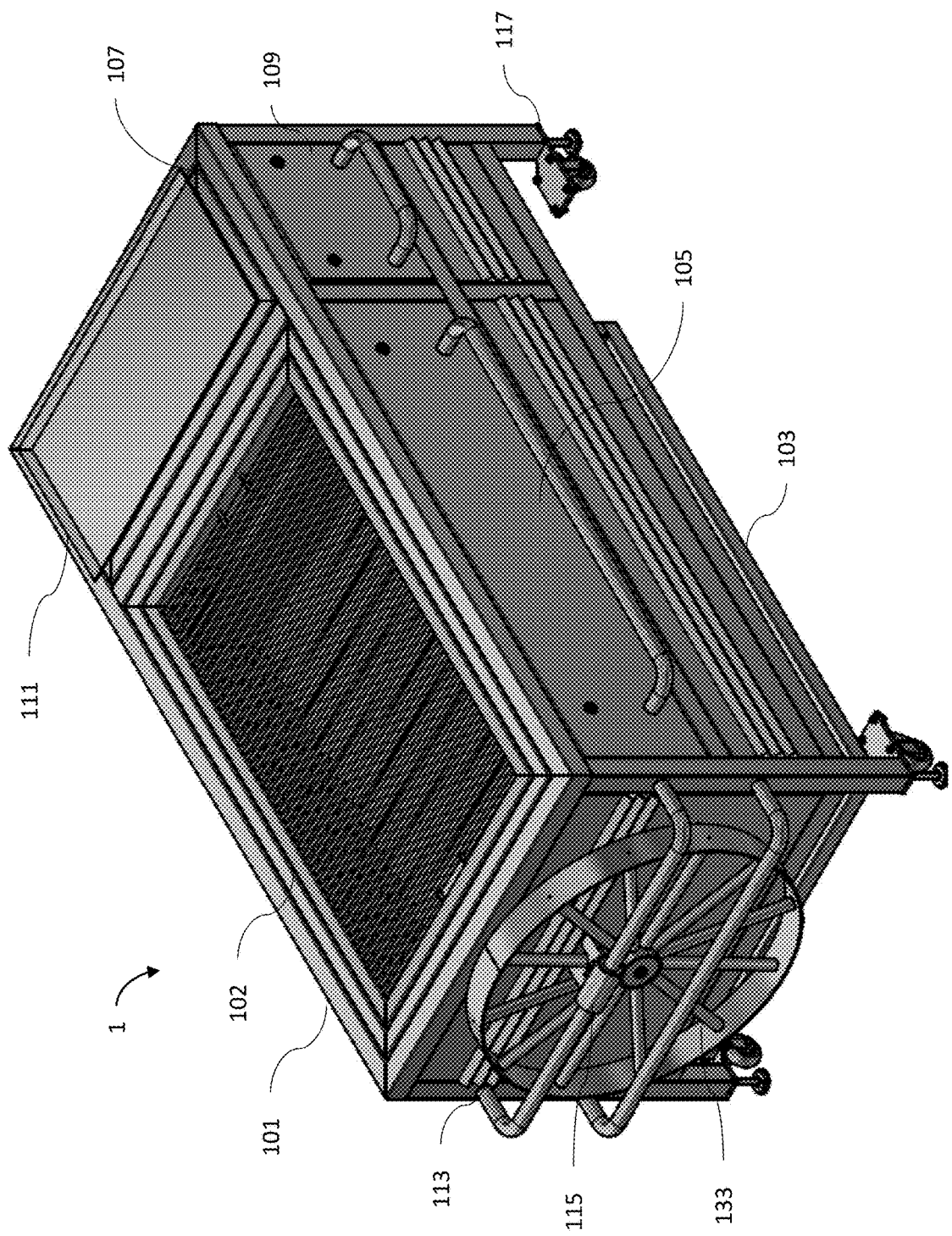
FIG. 1 is an isometric view of one embodiment of a grill according to the present teachings.

FIG. 1 shows an isometric view of one embodiment of a grill, more specifically a grill with an internal adjustable grill grate according to the present teachings.

The grill 1 may be made of a grill frame 101. The grill frame 101 may be a quadrilateral, a rectangle or any other geometric shape which can house the components of the grill 1.

The grill 1 may also have a first grate 102 on top of an adjustable frame 103. The first grate 102 and the adjustable frame 103 may be a quadrilateral, a rectangle or any other geometric shape capable of being housed in the grill frame 101. In one embodiment the grill frame 101, the first grate 102, and the adjustable frame 103, may all be substantially the same shape wherein the first grate 102 is smaller and within the adjustable frame 103 and the adjustable frame is smaller and within the grill frame 101. The adjustable frame 103 may be housed within the grill frame 101.

A first fuel drawer 105 may be housed inside the grill frame 101 and inside the adjustable frame 103 below the first grate 102. The first fuel drawer may be a quadrilateral, a rectangle, or any other geometric shape capable of being housed inside the adjustable frame 103 and below the first grate 102.

The grill 1 may also have a second grate 107 above a second fuel drawer 109. The second fuel drawer 109 may be housed inside of the grill frame 101 and the second grate 107 may be inlaid the grill frame 101. A grill plate 111 may be above the second grate 107. The second grate 107 and the second fuel drawer 109 may be a quadrilateral, a rectangle, or any other geometric shape capable of being housed in the grill frame 101.

The grill 1 may have a single grill grate or multiple grill grates and corresponding fuel drawers as necessary. In one embodiment there may be multiple fuel drawers per grill grate. In an alternate embodiment there may be multiple grill grates per fuel drawer. All or some of these grill grates may be adjustable or static. The grill grates may be adjusted by a single mechanism, independently adjusted by separate mechanisms, or a combination of the above.

The second grate 107 and the second fuel drawer 109 may be adjacent to the first grate 102 and the first fuel drawer 105 and may be the same or different size and shape as the first grate 102 and the first fuel drawer 105. The grill plate 111 may cover part or all of the first grate 102 and/or the second grate 107. The grill plate 111 may be removable or affixed above the first and/or second grates 102, 107.

In one embodiment the first fuel drawer 105 and the second fuel drawer 109 may contain a heat source. The heat source may be charcoal, gas, propane, or other heat sources used in known grills. The first fuel drawer 105 and the second fuel drawer 109 may contain the same or different heat sources. For example, the first fuel drawer 105 may contain charcoal and the first grate 102 may be a charcoal grill while the second fuel drawer 109 may contain a gas burner connected to a propane tank and the second grill grate 107 may be a gas grill. The fuel drawers 105, 109 may be extendable horizontally out of the housing 101. The fuel drawers 105, 109 may be fully extendable, partially extendable, or removeable from the housing 102 allowing a user to, for example, replace the drawer, preform repairs, add fuel, or have better access to the inside of the grill, although not limited thereto. In one embodiment a front face of the fuel drawers 105, 109 may be flush or substantially level with a side of the housing 102 and may be opened or extended away from the side of the housing 102 as necessary.

The grill 1 may also have a wheel 113. The wheel 113 may be attached to a wheel shaft (not shown in FIG. 1). The wheel shaft may be connected to the adjustable frame 103 such that as the wheel shaft is rotated, the adjustable frame may be raised or lowered. The wheel 113 and wheel shaft may be connected to the adjustable frame 103 by wires, chains, pulleys, belts, gears, other means for translating rotational motion into vertical motion, or any combination of the aforementioned.

The grill 1 may also have a wheel lock 115. The wheel lock 115 may be actuated against the wheel 113, preventing the wheel 113 from moving and thereby securing the position of the adjustable frame 103.

The grill 1 may also have a leg end 117 attached to the grill frame 101. The grill frame 101 may have a leg end 117 attached to the bottom of each portion of the grill frame 101 touching the ground. In one embodiment the grill 1 may have a leg end 117 attached to each corner of the grill frame 101 adjacent to the ground. The leg end 117 may have a wheel and/or an adjustable peg.

In one embodiment, the wheel 113 may be outside the grill frame 101 and may be connected to the wheel shaft. The wheel shaft may be inside the grill frame 101 below the first fuel drawer 105. The wheel shaft may be connected to the bottom of the adjustable frame 103 by one or more wires. As the wheel 113 and connected wheel shaft are rotated in a first direction, the wires may be coiled around the wheel shaft, shortening the length of the wires and pulling the bottom of the adjustable frame 103 closer to the wheel shaft, thereby raising the adjustable frame. The first grill plate 102 may be atop the adjustable frame 103 and may be raised up away from the first fuel drawer 105 along with the adjustable frame 103. The first fuel drawer 105 may be filled with burning charcoal, thus raising the first grill grate 102 may lower the temperature of the first grate 102 and lowering the first grill grate 102 may raise the temperature of the first grill grate 102.

In one embodiment the first grill grate 102 may be inlaid the adjustable frame 103 such that the first grill grate 102 and the top of the adjustable frame are flush and/or substantially level with each other. The top of the adjustable frame 102 may also be flush and/or substantially level with the top of the housing 101 in a resting position. The adjustable frame 102 may be extended above the housing 101 continuously or by preset amounts. For example the wheel 115 may be rotated continuously raising the adjustable frame 103 vertically and locked in any position or the wheel 115 may have preset or settable locking positions providing preset vertical positions of the adjustable frame 103.

In one embodiment the position of the adjustable frame 103, the first fuel drawer 105, and the second fuel drawer 109 may prevent movement of each other. For example, the adjustable frame 103 may prevent one or both of the fuel drawers 105, 109 from opening when in a vertically raiser position. Similarly, when the first fuel drawer 105 is in an open position this may prevent the adjustable frame 103 from moving and/or the second fuel drawer 109 from being opened/closed. The same may be true for the second fuel drawer 109 and/or any additional fuel drawers used in the system. in an alternate embodiment the adjustable frame 103 and/or the fuel drawers 105, 109 may be movable irrespective and independent of the position of any other parts of the grill 1 and without moving other parts of the grill 1.

In one embodiment the grill 1 may have a length of 1,000 mm to 2,500 mm, a width of 600 mm to 1,200 mm and a height of 500 mm to 1,000 mm. The grill 1 may preferably have a length of 1,500 mm to 2,000 mm, a width of 800 mm to 1,000 mm and a height of 750 mm to 850 mm. The grill 1 may further preferably have a length of 1,825 mm, a width of 900 mm and a height of 800 mm with a tolerance of 25 mm in each dimension.

In one embodiment the adjustable frame 102 may have a length of 800 mm to 1600 mm, a width of 600 mm to 1,000 mm and a height of 600 mm to 1,000 mm. The adjustable frame 102 may preferably have a length of 1,000 mm to 1,400 mm, a width of 750 mm to 850 mm and a height of 750 mm to 850 mm. The adjustable frame 102 may further preferably have a length of 1,275 mm, a width of 800 mm and a height of 800 mm with a tolerance of 25 mm in each direction.

In one embodiment the wheel 113 may have a diameter of 500 mm to 1,000 mm. The wheel 113 may preferably have a diameter of 600 mm to 800 mm. The wheel 113 may further preferably have a diameter of 700 mm with a tolerance of 25 mm.

The grill 1 and its component parts may be made of stainless steel, iron, aluminum, metal alloys, heat treated metals, heat resistant or heat proof materials, or other known materials used in grills.

Figure 2:
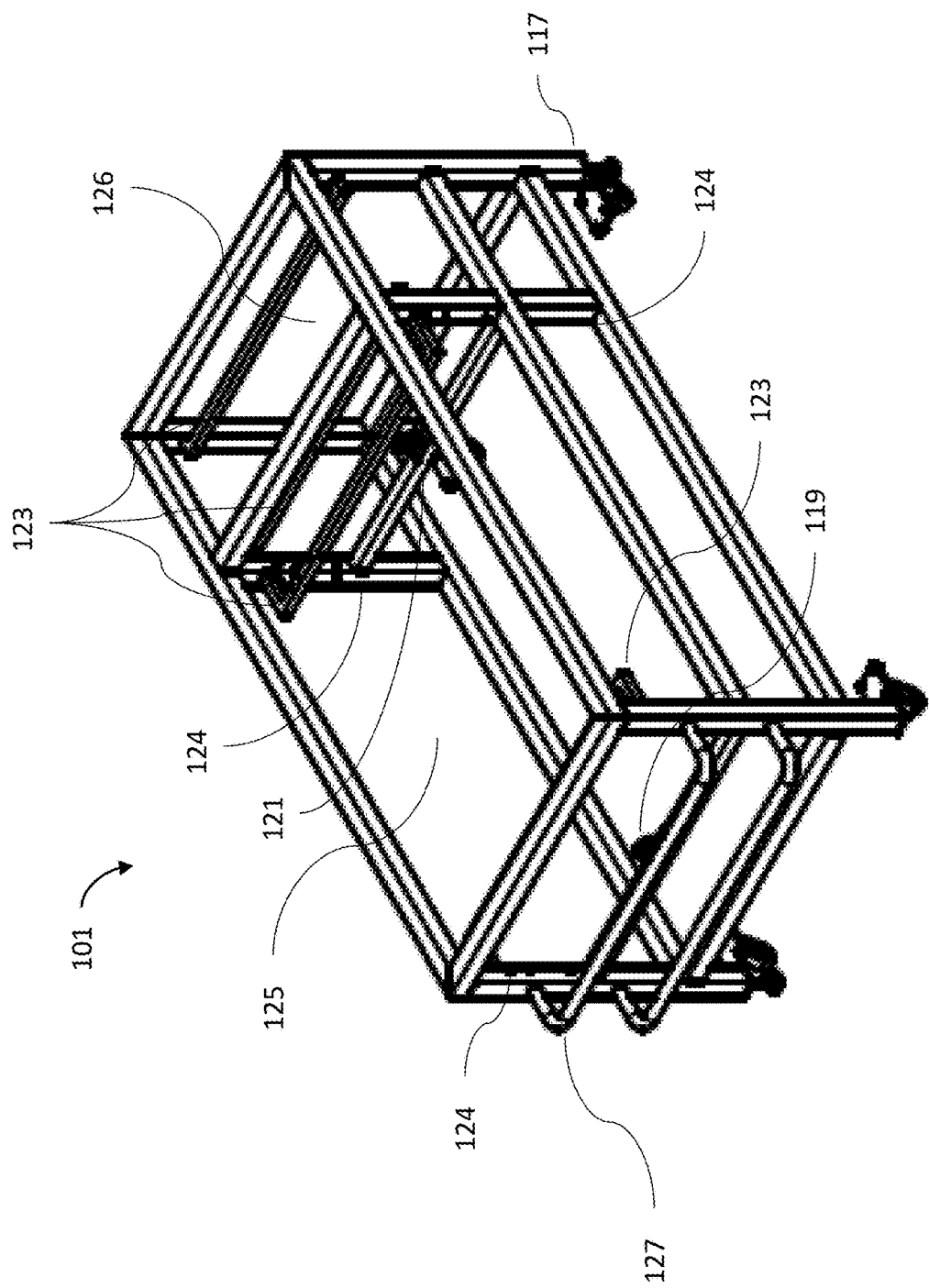
FIG. 2 is an isometric view of one embodiment of a grill frame according to the present teachings.

Referring now to FIG. 2, shown is one embodiment of an isometric view of the grill frame, more specifically a grill frame for use with an internal adjustable frame according to the present teachings.

The grill frame 101 may have a first set of bearings 119 and a second set of bearing 121. The bearings 119, 121 may secure the ends the wheel shaft within the grill frame 101 such that it may rotate both clockwise and counterclockwise.

The grill frame 101 may also have drawer rails 123. The grill may have multiple drawer rails 123, with one drawer rail 123 on either side of the first grill chamber 125 and the second grill chamber 126. The first grill grate 102, the adjustable frame 103, and the first fuel drawer 105 may be housed in the first grill chamber 125. The second grill grate 107 and the second fuel drawer 109 may be housed in the second grill chamber 126. The fuel drawers 105 and 109 may rest on the drawer rails 123 in their respective chambers and may slide in the lateral direction in and out of the grill frame 101. The fuel drawers 105, 109 may slide out of the grill frame 101 partially or fully and may have more fuel, wood, charcoal, or other flammable fuel, added or removed from the fuel drawer 105, 109.

The grill frame 101 may also have corner rails 124. The grill frame 101 may have multiple corner rails 124, each corner rail 124 may be positioned against the vertical structure pieces of the grill frame 101 in the first grill chamber 125. The adjustable frame 103 may be positioned inside the grill frame 101 and the first grill chamber 125 against each of the corner rails 124. The corner rails 124 may have bearings to stabilize the adjustable frame 103 and may allow for smooth vertical movement.

In one embodiment the wheel shaft may be attached to the first set of bearings 119 and the second set of bearings 121.

The first fuel drawer 105 may be positioned on the drawer rails 123 in the first grill chamber 125 and above the wheel shaft. The adjustable frame 103 may be inside the first grill chamber 125 against each of the corner rails 124 in the corners of the grill chamber 125. The adjustable frame 103 may surround the first fuel drawer 105 and the wheel shaft. The adjustable frame 103 may be connected to the wheel shaft and may be movable in the vertical direction without affecting the position of the first fuel drawer 105. The first fuel drawer 105 may be moved horizontally in and out of the grill frame 101 regardless of the position of the adjustable frame 103.

The grill frame 101 may also have one or more handlebars 127. The handlebars 127 may be attached to the exterior of the grill frame 101 and may be used as handholds to move the grill 1. The wheel 113 may be positioned between the handlebars 127 and the first set of bearings 119. This configuration may prevent objects from getting caught in the wheel 113. In one embodiment the wheel lock 115 may be attached to the handlebar 127.

Figure 3:
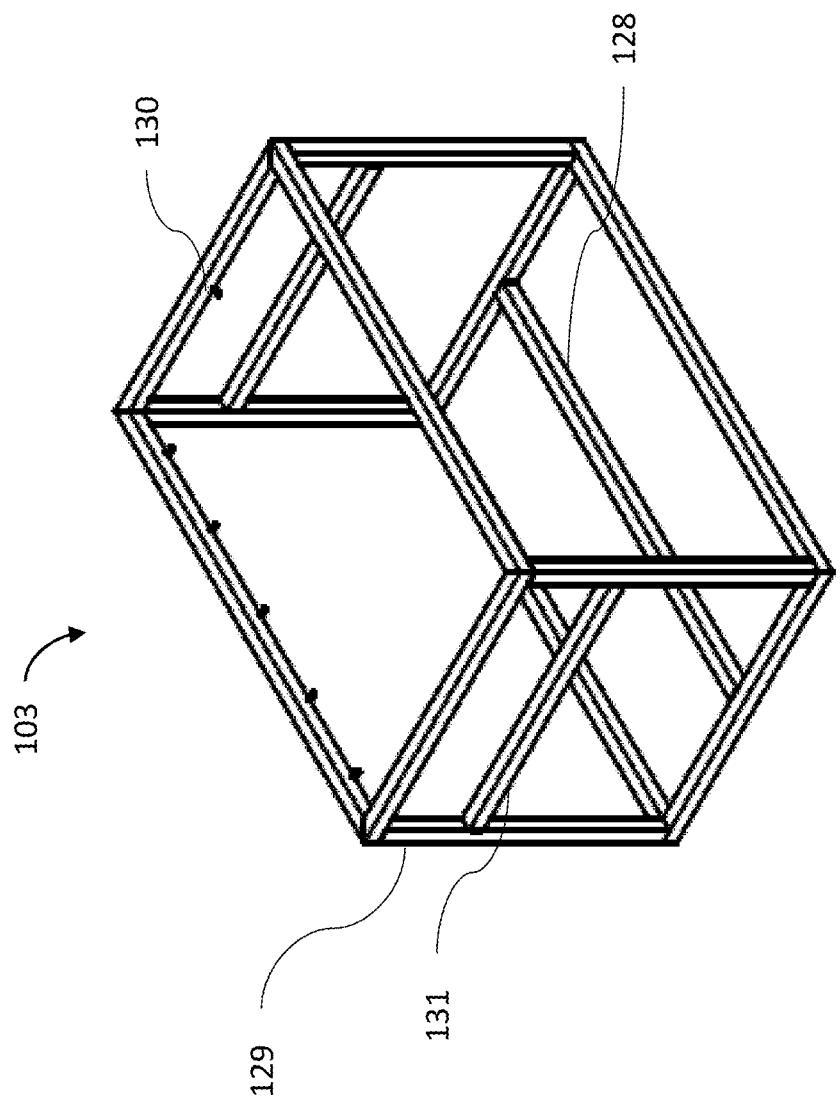
FIG. 3 is an isometric view of one embodiment of an adjustable frame according to the present teachings.

Referring now to FIG. 3, shown is an isometric view of the adjustable frame, more specifically an adjustable frame for use with a grill according to the present teachings.

The adjustable frame 103 may have a cross bar 128 across the bottom of the adjustable frame 103. The cross bar 128 may bisect the bottom of the adjustable frame 103 in half or unevenly. The cross bar 128 may be aligned in the same direction and/or underneath the wheel shaft (not shown in FIG. 3). The wheel shaft may be connected to the adjustable frame 103 and/or cross bar 128 using wires, chains, pulleys, belts, gears, other means for translating rotational motion into vertical motion, or any combination of the aforementioned.

The adjustable frame 103 may also have vertical supports 129. The vertical supports 129 may be in each corner of the adjustable frame 103. In a preferred embodiment, the adjustable frame 103 may be a rectangular prism and may have four vertical supports 129, one in each corner of the adjustable frame 103. The vertical supports 129 may be adjacent to the corner rails 124 such that each vertical support 129 is adjacent to a corresponding corner rail 124 simultaneously, this may provide additional stability to the adjustable frame 103 and may facilitate vertical movement of the adjustable frame 103.

The adjustable frame 103 may also have a series of pegs 130. The pegs 130 may line the interior perimeter of the top of the adjustable frame 103. The first grill grate 102 may rest in the interior perimeter of the top of the adjustable frame 103 atop the pegs 130. There may be as few or as many pegs 130 along each interior edge of the adjustable frame 103 as necessary to support the first grill grate 102. For example, the adjustable frame 103 may have five pegs 130 on each of the longitudinal edges and one peg 130 on each of the edges adjacent thereof.

The adjustable frame 103 may also have guard bars 131. The guard bars 131 may be positioned above the wheel shaft in one or more of the sides of the adjustable frame 103 perpendicular to the wheel shaft. In a preferred embodiment there may be two guard bars 131, one in each of the sides of the adjustable frame 103 perpendicular to the wheel shaft. The guard bars 131 may rest on or be slightly above the wheel shaft when the adjustable frame 103 is extended down to its lowest point. The guard bars 131 may prevent the adjustable frame 103 from lowering beyond a preset point by resting on the wheel shaft.

Figure 4A:
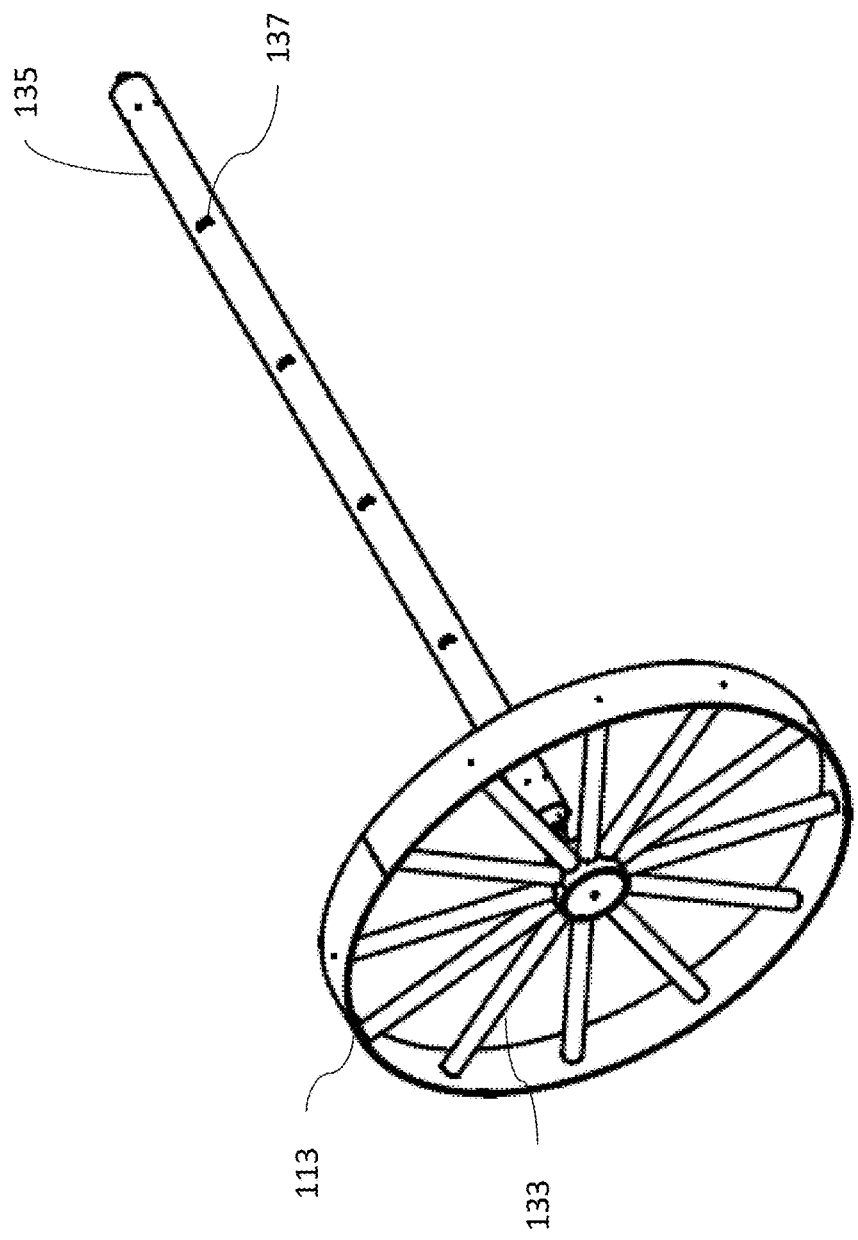
FIGS. 4A-C are isometric views of one embodiment of the wheel mechanism and associated parts according to the present teachings.
Figure 4B:
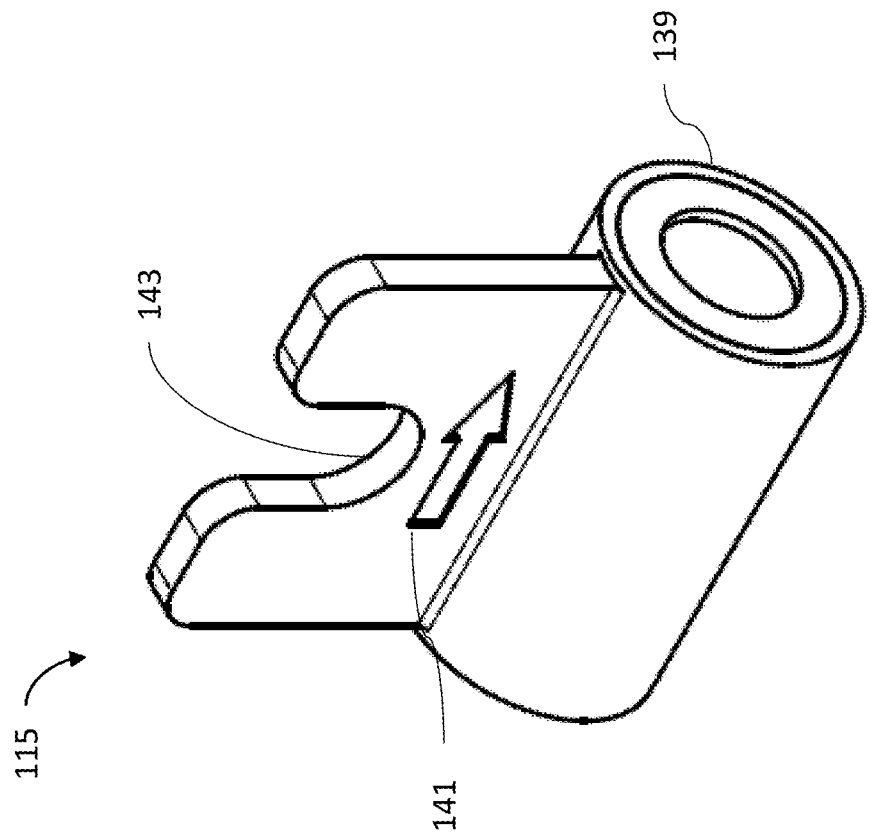
Figure 4C:
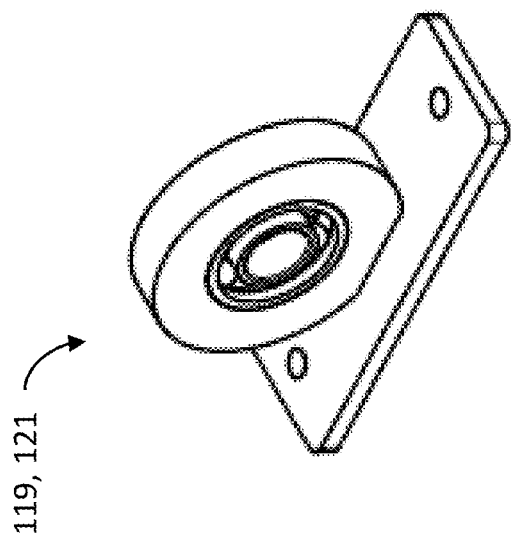

Referring now to FIGS. 4A-C, shown is an isometric view of one embodiment of the wheel mechanism and associated parts, more specifically the wheel, wheel shaft, wheel lock, and the wheel shaft bearings according to the present teachings.

The wheel 113 may be solid, or have a plurality of spokes 133, and may be circular, oval or polygonal. It is understood that while this embodiment of the invention is described using various wheels, the invention is not limited thereto and may use a lever, crank, gear system, pulleys, pistons, motors, other device to provide a user mechanical advantage, or machine to facilitate movement of the adjustable frame 103.

In one embodiment, the wheel 113 may have a plurality of spokes 133 projecting radially outward from the center of the wheel 113. The wheel lock 115 may be actuated against one of the plurality of spokes 133 and may prevent the wheel 113 from turning. The wheel 113 may have as many or as few spokes 133 as necessary to achieve structural stability of the wheel 113 and adequate locking positions as desired.

The wheel shaft 135 may be attached to the wheel 113. A proximal end of the wheel shaft 135 may be connected to and may pass through the first set of bearings 119 and distal end of the wheel shaft 135 may be connected to the second set of bearings 121. The wheel 113 may be positioned on one side of the first set of bearings 119 opposite the body of the wheel shaft 135 and the wheel 113 may be attached to the wheel shaft 135. The wheel 113 may have a greater diameter than the wheel shaft 135, providing a mechanical advantage for turning the wheel shaft 135.

The wheel shaft 135 may have one or more anchors 137. The wheel shaft 135 may be connected to the cross bar 128 by a wire, chain, heat resistant rope, belt or other heat resistant material. The first end of the wire, chain, heat resistant rope, belt or other heat resistant material may be secured to the wheel shaft 135 via the anchor 137 and the second end may be attached to the cross bar 128. As the wheel shaft 135 is rotated the wire or other material connecting the wheel shaft 135 to the cross bar 128 may be coiled around the wheel shaft 135 thereby shortening the length of the wire or other material connecting the wheel shaft 135 to the cross bar 128 and pulling the cross bar 128 closer to the wheel shaft 135.

The wheel lock 115 may have a bearing 139, an indicator 141 and a spoke hook 143. The wheel lock 115 may be attached to the handlebar 127 by the bearing 139 and may be rotated around the central axis of the bearing 139. The indicator 141 may point in either direction signaling to users which direction the wheel 113 may be rotated to raise the adjustable frame 103. The spoke hook 143 may be U-shaped to correspond to the size and shape of the spokes 133. For example, the spoke hook 143 may be V-shaped where the spokes 133 are polygonal or any other shape which corresponds to the size and shape of the spokes 133. The wheel lock 115 may be actuated towards the wheel 113 around the central axis of the bearing 139, the spoke hook 143 may be slotted around of the spokes 133 preventing the wheel 113 from further rotation.

FIG. 4C depicts a wheel shaft bearing. The wheel shaft bearing may be on one or both ends of the wheel shaft 135. The wheel shaft bearing may be the first set of bearing 119 and/or the second set of bearings 121. The bearings 119, 121 may be the same or different types of bearings.

It is understood that the disclosed wheel, spoke, and wheel lock is one embodiment of the present invention and is non-limiting. The wheel and wheel lock may be any other system for imparting rotational motion to the wheel shaft that may be locked in a set position.

Figure 5A:
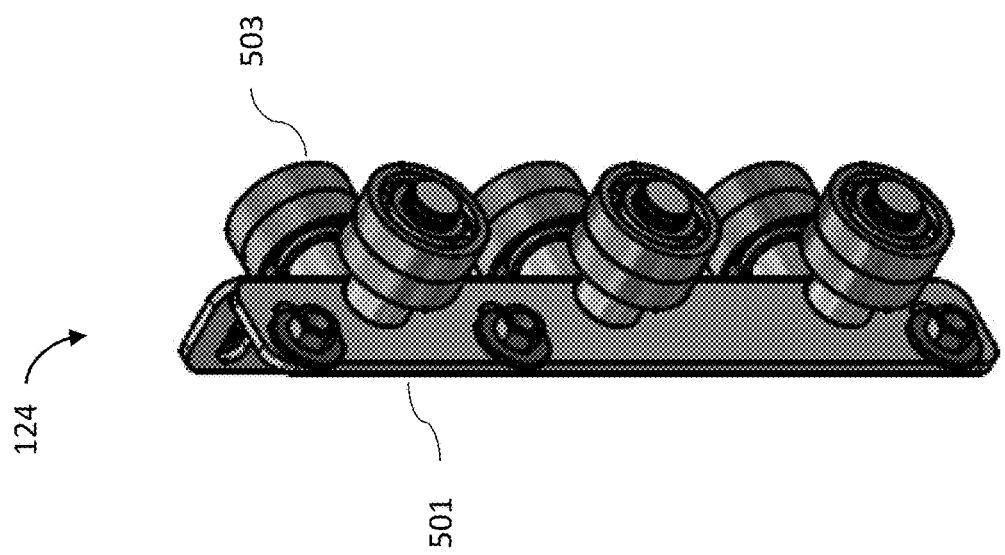
FIGS. 5A-B are an isometric and top-down view of one embodiment of a corner rail according to the present teachings.
Figure 5B:
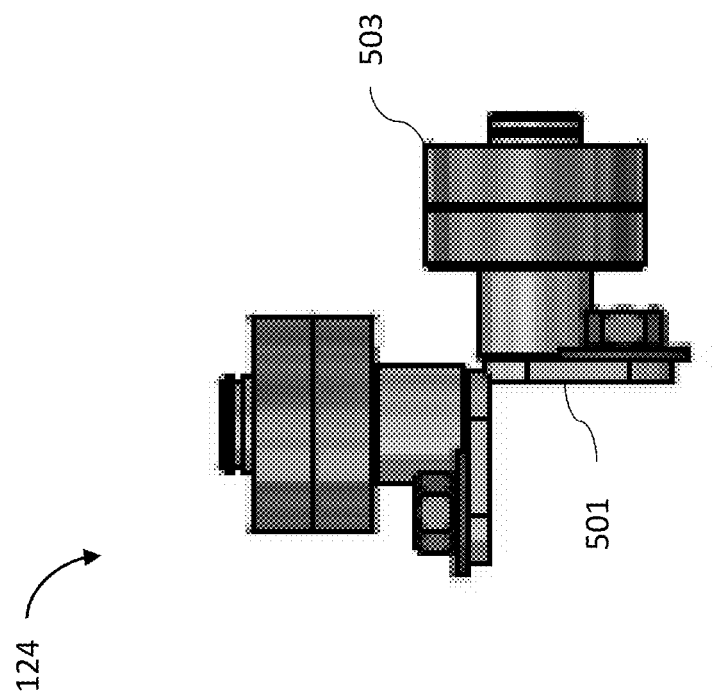

Referring now to FIGS. 5A-B, shown is an isometric view and a top-down view of one embodiment of the corner rail according to the present teachings.

The corner rail 124 may have an adhering end 501 and a bearing end 503. One or more corner rails 124 may be positioned along each inside edge of the first grill chamber 125 along the vertical supports of the grill frame 101. The corner rails 124 may line the entire edge of the vertical supports or may be spaced apart as necessary to support the adjustable frame 103. The adhering end 501 of each corner rail 124 may be disposed against to the grill frame 101 via screws, welds, or other means of adhering metal. The bearing end 503 may be opposite the adhering end 501 and may be comprised of one or more bearings. The bearing end 503 may be disposed against the outside vertical edge of the adjustable frame 103 and may facilitate vertical movement and restrict horizontal movement of the adjustable frame 103.

As shown in FIG. 5B, the corner rail 124 may be an X-shape whereby two of the adjacent legs of the X form the adhering end 501 and the remaining two legs of the X may form the bearing end 503.

Figure 6A:
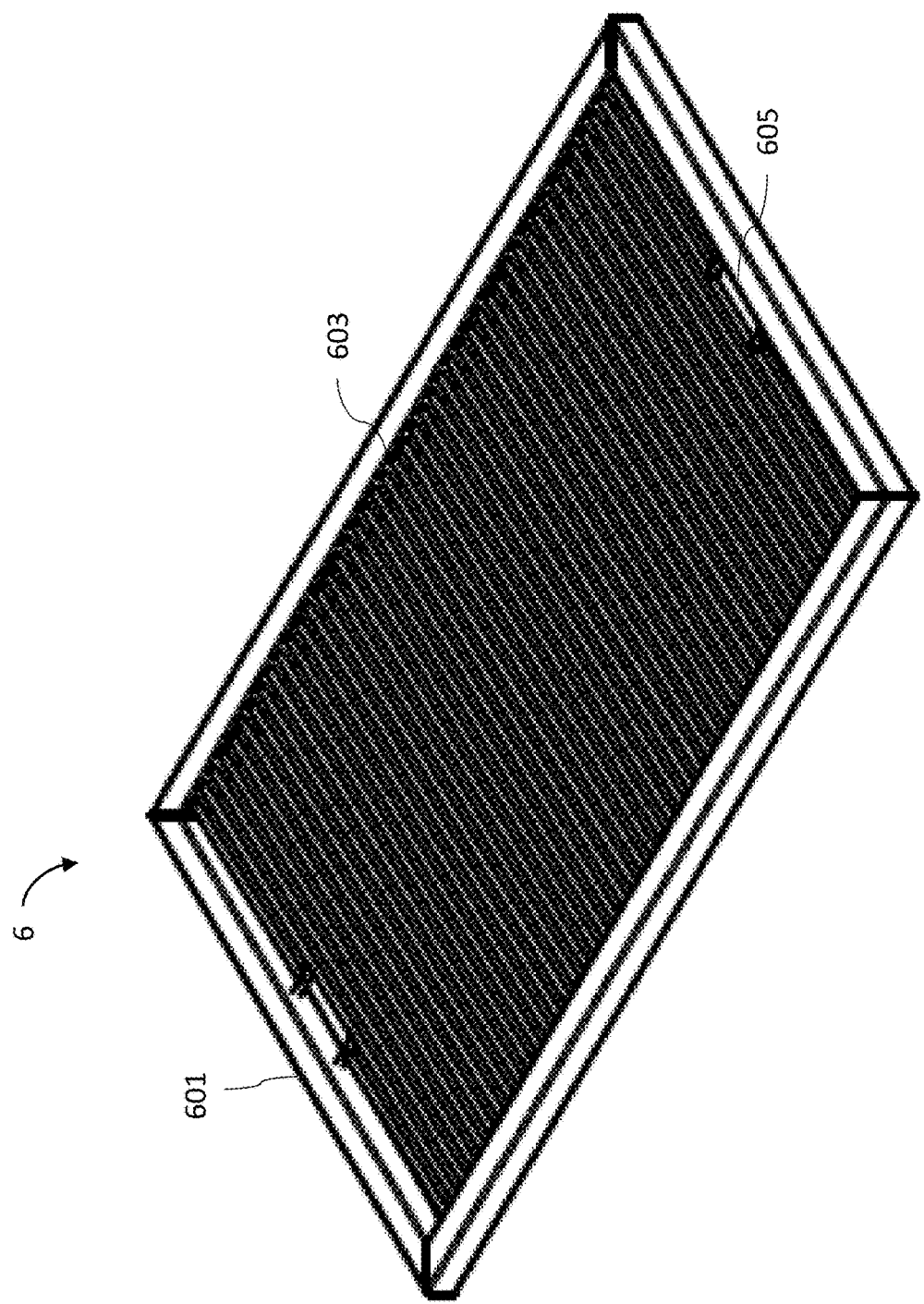
FIGS. 6A-C are an isometric and cross-sectional views of one embodiment of a grill grate according to the present teachings.
Figure 6B:
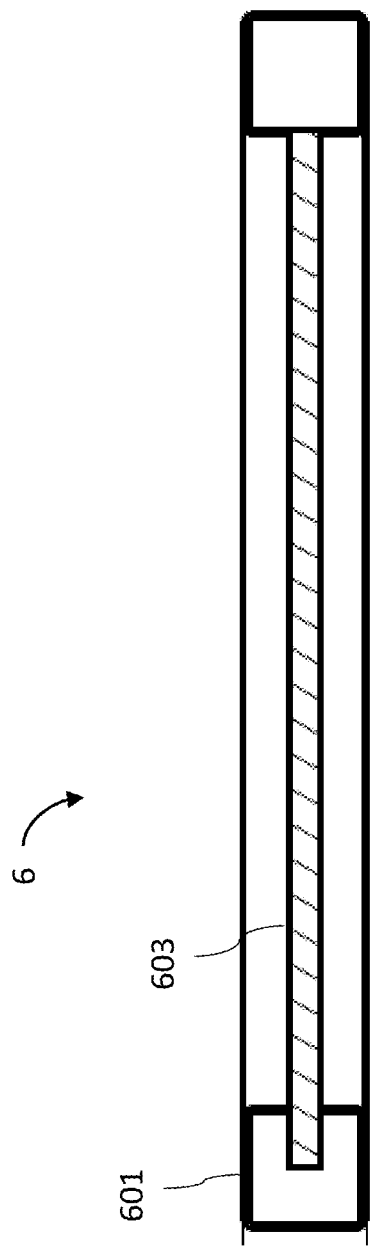
Figure 6C:
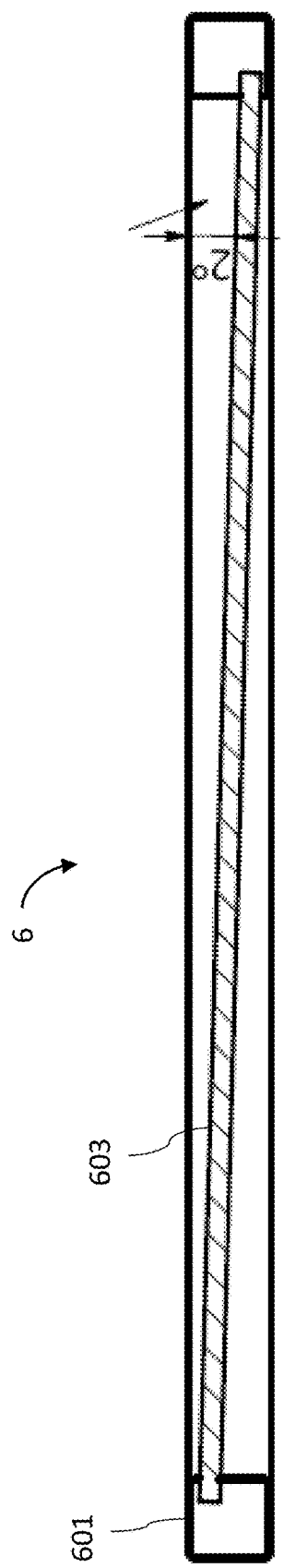

Referring now to FIGS. 6A-C, shown is an isometric view and cross section side views of one embodiment of a grill grate according to the present teachings.

The grill grate 6 may be the first grill grate 102 or the second grill grate 107. The grill grate 6 may have a grate frame 601, grate bars 603, and a handle gap 605. The grate frame 601 may sit atop the pegs 130 of the adjustable frame 103 or pegs on the grill frame 101 on the top interior edge of the second grill chamber 126.

A plurality of grate bars 603 may be inside of the grate frame 601. The grate bars 603 may be parallel and/or perpendicular to the wheel 113 and may all be oriented in the same direction or different directions forming a lattice as desired. The grate bars 603 may be cylinders, ovals, V-shaped bars or any other shaped bar capable of supporting food and may be the same or varying thickness as one another and may be spaced apart from one another as desired. The grate bars 603 may be evenly spaced apart creating a uniform surface or may be non-uniformly spaced creating a varying surface of the grill grate 6. As illustrated in FIGS. 6B-C, the grate bars 603 may be level or angled within the grate frame 601.

A handle gap 605 may bisect one or more of the grate bars 603 that are adjacent to the grate frame. The handle gap 605 may be along one or more edges of the grate frame 601.

In one embodiment the grill grate 6 may sit atop pegs 130 in the adjustable frame and/or pegs in the grill frame 101. The grill grate 6 may be removable from the grill 1 for replacement, cleaning, or to be swapped for a different style grill grate, although not limited thereto. The grill grate 6 may be easily removed via the handle gaps 605. It is understood that the use of hooks or other tools may be used in conjunction with or in place of the handle gaps 605.

Figure 7:
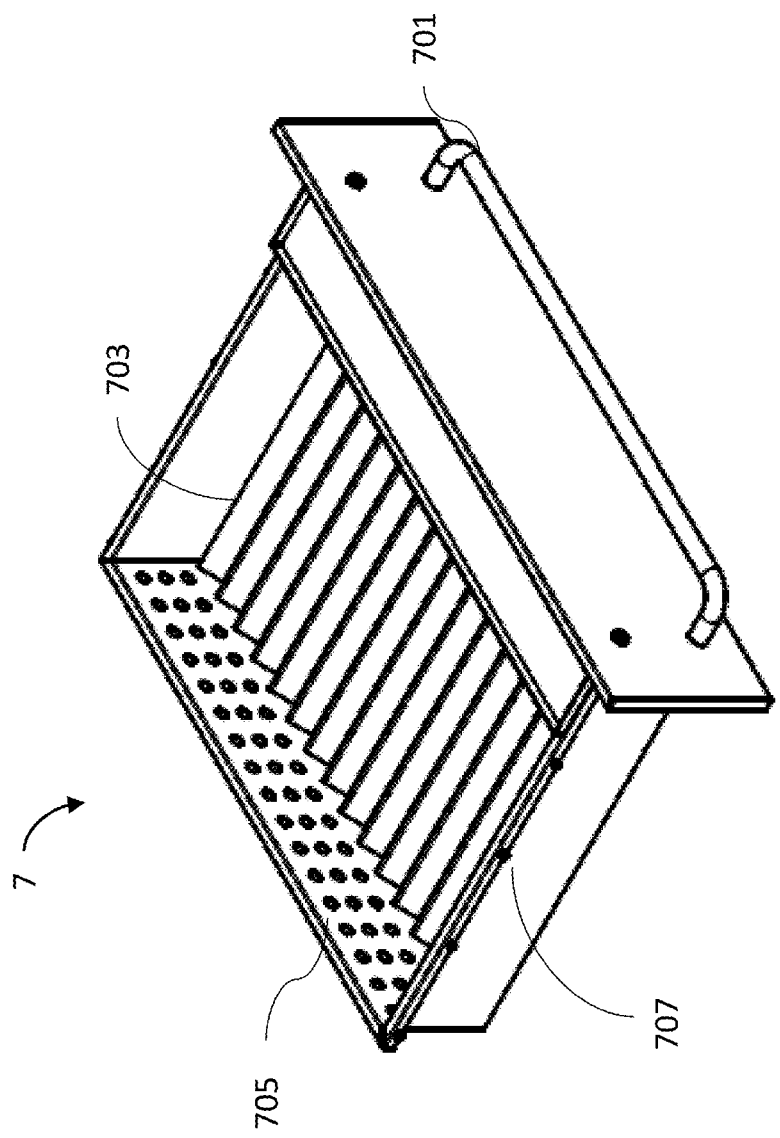
FIG. 7 is an isometric view of one embodiment of a fuel drawer according to the present teachings.

Referring now to FIG. 7, shown is an isometric view of one embodiment of a fuel drawer according to the present teachings.

The fuel drawer 7 may be the first fuel drawer 105 or the second fuel drawer 109. The fuel drawer 7 may have a drawer handle 701, drawer floor 703, and ventilation 705. The drawer handle 701 may be attached to the front of the fuel drawer 7. The drawer floor 703 may be a textured surface for example an accordion shape. The textured surface of the drawer floor 703 may displace burning wood and or charcoal in the fuel drawer 7 and facilitate air flow thereby increasing and maintaining a uniform temperature.

The ventilation 705 may be a series of holes, slits, or other openings in the back and side of the fuel drawer 7. The ventilation 705 may facilitate air flow in the fuel drawer 7 thereby increasing and maintaining a uniform temperature.

The fuel drawer 7 may also have one or more drawer bearings 707 along opposite edges of the fuel drawer. The drawer bearings 7 may line the underside of a top lip of the fuel drawer 7 along the top edges adjacent to the drawer handle 701. The drawer bearings 707 may be disposed on top of the drawer rails 123 and may facilitate horizontal movement in one direction. The fuel drawer 7 may be moved in the horizontal direction being pulled or pushed by the drawer handle 701.

Figure 8:
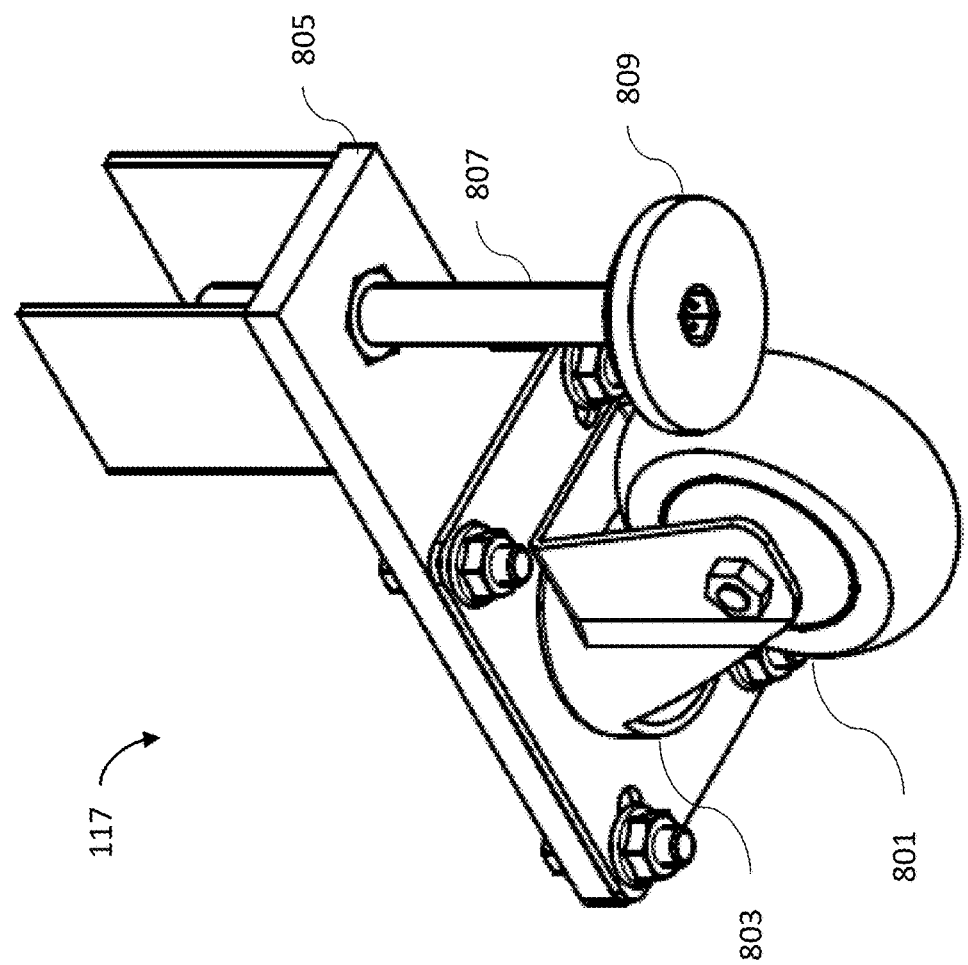
FIG. 8 is an isometric bottom view of one embodiment of a leg end according to the present teachings.

Referring now to FIG. 8, shown is an isometric bottom view of one embodiment of a leg end according to the present teachings.

The leg end 117 may have a pivot wheel 801. The pivot wheel 801 may be attached to a top plate 805 via a swivel 803. The swivel 803 may have 360 degrees of rotation allowing the pivot wheel 801 to turn and move in any direction.

The leg end 117 may also have an adjustable peg 807. The adjustable peg 807 may be attached to the top plate 805 and may be extended or retracted through the top plate 805. The adjustable peg 807 may have a foot 809 attached to an end of the adjustable peg 807 distal to the grill 1. The adjustable peg 807 may be extended towards the ground, extending the foot 809 past the bottom of the pivot wheel 801, lifting the pivot wheel 801 off the ground or sharing the load of the grill 1 between the pivot wheel 801 and the foot 809. The foot 809 may be made of rubber or other material with a high coefficient of friction to prevent or restrict movement of the grill 1 when extended.

Figure 9A:
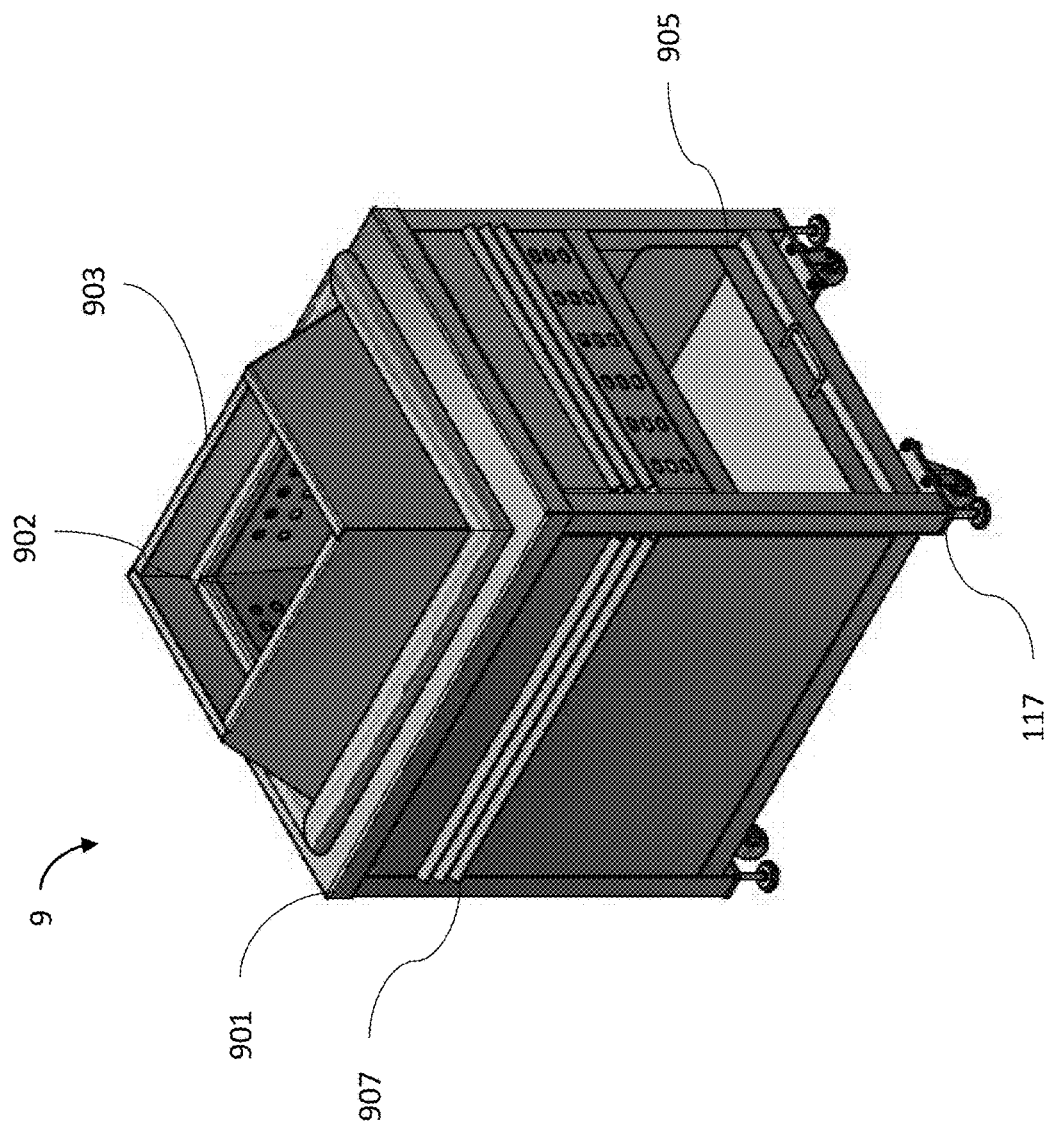
FIGS. 9A-B is an isometric and top-down view of one embodiment of a charcoal starter according to the present teachings.
Figure 9B:
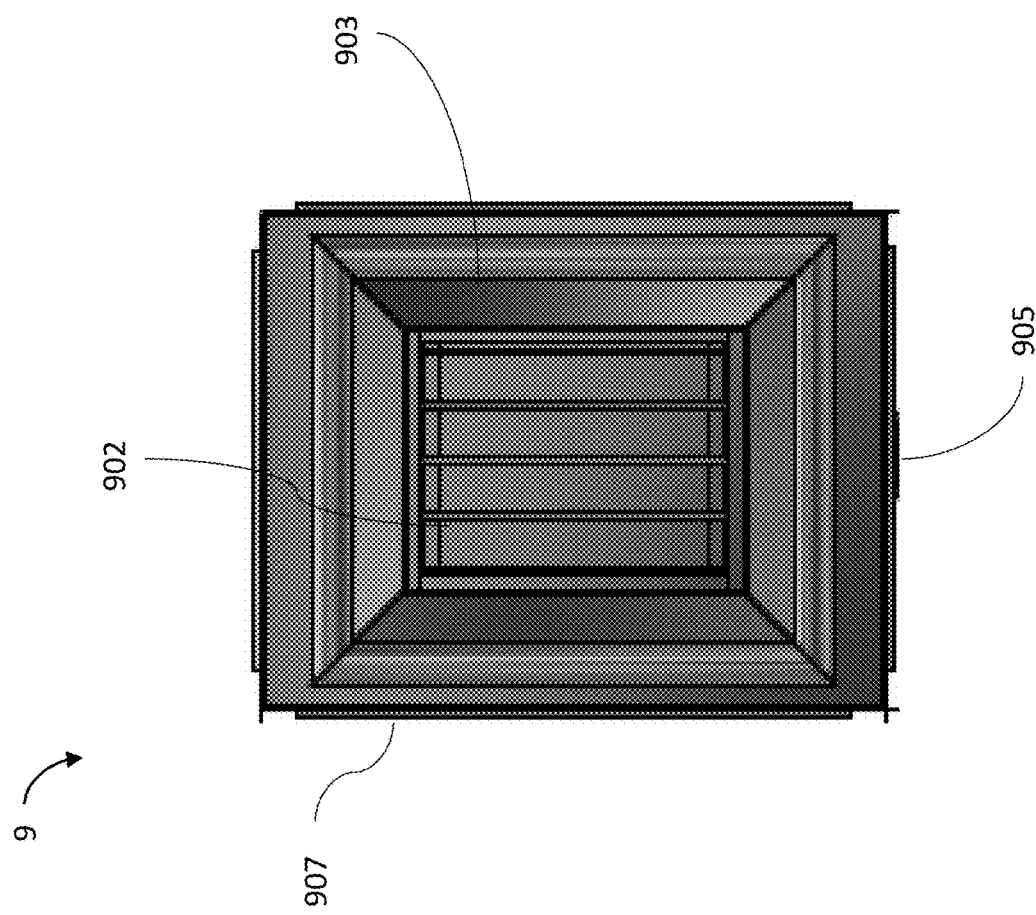

Referring now to FIGS. 9A-B, shown is an isometric and top-down view of one embodiment of a charcoal starter according to the present teachings.

The charcoal starter 9 may be removably attached to the grill 1. The charcoal starter 9 may have a fuel basket 902 housed inside the charcoal starter frame 901. Wood and/or charcoal may be added to the fuel basket 902 to be ignited. The fuel basket 902 may have a removable bottom allowing the fuel to be discharged once it has reached a desired temperature. The fuel basket 902 may have bars across the bottom opening.

A hood 903 may be placed on top of the charcoal starter frame 901 above the fuel basket 902. The hood 903 may be angled, directing the flow of heat, from the fuel being burned, up and away from nearby users. The angling of the hood 903 may also concentrate the heat in the charcoal starter 9 allowing the wood and/or charcoal to reach a desired temperature faster.

The charcoal starter 9 may also have a catch tray 905. The catch tray 905 may be housed inside the charcoal starter frame 901 below the fuel basket 902. The bottom of the fuel basket 902 may be removed discharging the fuel on to the catch tray 905. The catch tray 905 may be removed from the charcoal starter 9 and discharged material may be collected.

Ventilation slits 907 may be positioned around the perimeter of the charcoal starter 9, increasing airflow to the fuel basket 902. The ventilation slits 907 may be holes, accordion folds, slits, or other openings to allow for increased airflow to the interior of the charcoal starter 9.

Figure 10:
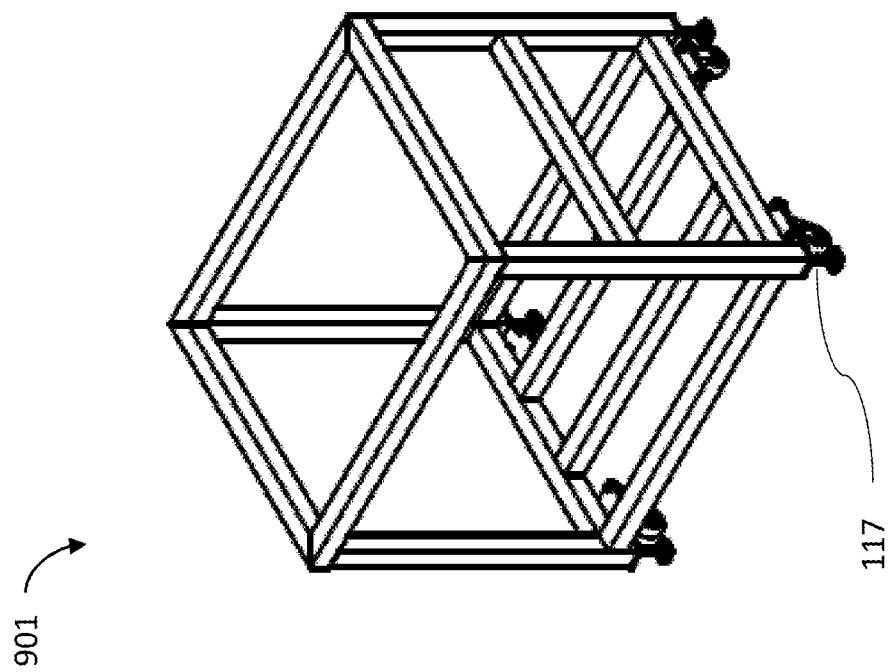
FIG. 10 is an isometric view of one embodiment of a charcoal starter frame according to the present teachings.

FIG. 10 shows one embodiment of the charcoal starter frame 901 according to the present teachings.

Figure 11A:
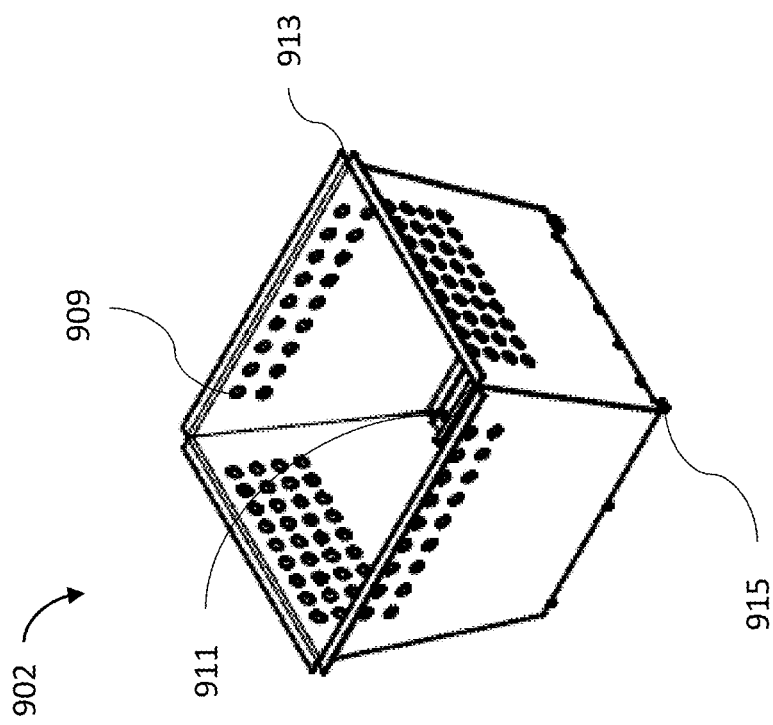
FIGS. 11A-B are an isometric and top-down view of one embodiment of a fuel basket according to the present teachings.
Figure 11B:
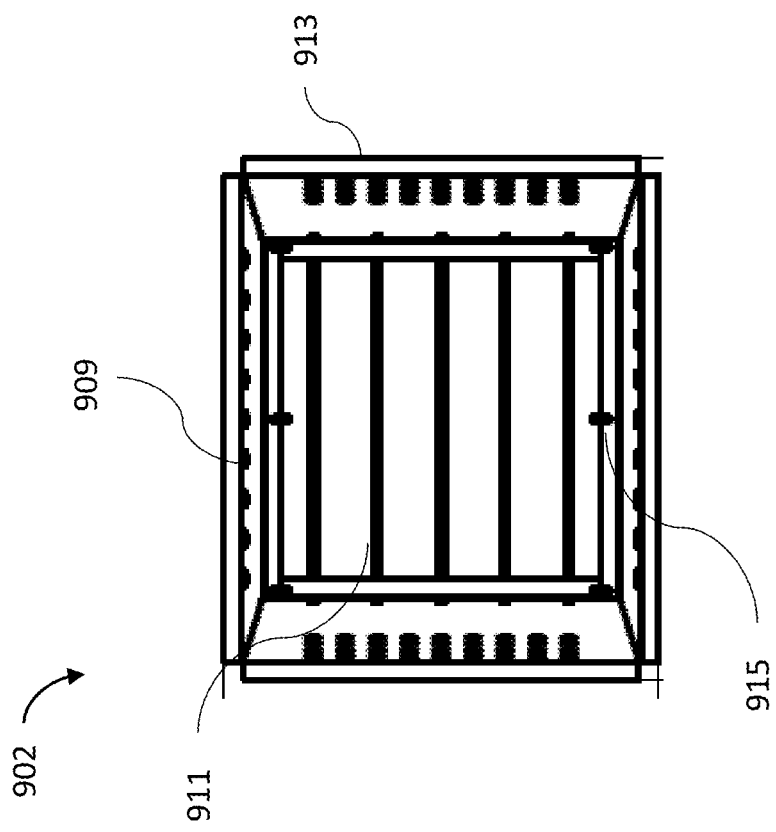

Referring now to FIGS. 11A-B, shown is an isometric and top-down view of one embodiment of a fuel basket according to the present teachings.

The fuel basket 902 may have ventilation holes 909 on one or more of its sides, increasing airflow to the fuel basket 902. The ventilation holes 909 may be holes, slits, or other openings to allow for increased airflow to the interior of the fuel basket 902.

The fuel basket 902 may also have bars 911 across its bottom. The bars 911 may provide structural stability to the fuel basket 902 and may distribute the weight of the fuel more evenly across the bottom of the fuel basket 902.

The fuel basket 902 may be removably attached to the charcoal starter frame 901 via a lip 913 on the fuel basket 902. The lip 913 may be a horizontal extension of the fuel basket 902 that's rests on top of the charcoal starter frame 901 such that the body of the fuel basket 902 drops down and is housed inside the charcoal starter frame 901.

The fuel basket 902 may also have a series of hooks 915 along its bottom, underhanging the fuel basket 902. One or more hooks 915 may line the bottom edges of the fuel basket 902 such that a removable bottom may be attached to the fuel basket 902 via the hooks 915. The bottom may be a pan, sheet of metal, or other substantially flat object that can be removably attached to the bottom of the fuel basket 902 to prevent the fuel from falling through. The bottom may be removed discharging the fuel in the fuel basket 902 past the bars 911 and on to the catch tray 905.

What is claimed is:

1. A grill system comprising:
a housing having an open top;
a frame inside of the housing;
a shaft rotatably attached to the housing and at least partially inside of the frame, the shaft being connected to the frame; and
a handle adjacent to a side of the housing connected to the shaft;
wherein the shaft and the handle move the frame vertically without moving the housing.

2. The grill system of claim 1 wherein as the shaft rotates clockwise, the frame moves vertically in a first direction;
wherein as the shaft rotates counterclockwise, the frame moves vertically in a second direction.

3. The grill system of claim 2 wherein the handle is a wheel.

4. The grill system of claim 1 further comprising a grate on top of the frame.

5. The grill system of claim 4 wherein the grate and the frame are flush.

6. The grill system of claim 1 wherein a vertical position of the frame is defined by a first position wherein the top of the housing and a top of the frame are flush; and
at least a second position wherein the top of the frame is extended away from the top of the housing.

7. The grill system of claim 1 further comprising a drawer having an open top inside of the housing and the frame and above the shaft;
wherein the drawer is horizontally extendable.

8. The grill system of claim 7 wherein a horizontal position of the drawer is defined by a first position wherein a front of the drawer is flush with a side of the housing; and
at least a second position wherein the front of the drawer is extended away from the side of the housing.

9. The grill system of claim 1 wherein the frame moves irrespective of the position of the drawer and the drawer moves irrespective of the position of the frame.

10. The grill system of claim 1 further comprising a heat source in the drawer.

11. The grill system of claim 10 wherein the heat source is charcoal.

12. The grill system of claim 1 further comprising one or more swivel wheels to a bottom of the housing;
wherein the grill is movable on the swivel wheels.

13. The grill system of claim 1 further comprising one or more legs;
each leg comprising a swivel wheel and a peg;
wherein the grill is movable on the swivel wheels;
wherein the peg is extendable preventing movement of the grill system.

14. A grill system comprising:
a housing;
a frame, movably imbedded inside the housing through a top of the housing;
a grate covering a top of the frame;
a wheel adjacent to a side of the housing, connected to a wheel shaft, the wheel shaft being parallel to the grate and disposed inside of and connected to the frame;
a lock releasably securing the wheel in set positions; and
a heat source disposed inside the frame below the grate and above the wheel shaft;
the wheel and wheel shaft being rotatable in a first direction and a second direction;
wherein as the wheel and the wheel shaft rotate in a first direction, the frame and the grate are raised out of the housing;
wherein as the wheel and the wheel shaft rotate in a second direction, the frame and the grate are lowered into the housing;
wherein the heat source is movable independent from the wheel, wheel shaft, frame, and grate; and
wherein the grate cannot be lowered below the heat source.

15. The grill system of claim 14, wherein the heat source is enclosed in a removable drawer, the drawer having a handle and an open top exposed to the grate.

16. The grill system of claim 15, wherein the drawer may be extended at least partially out of the housing exposing the heat source.

17. The grill system of claim 14, further comprising one or more legs attached to a bottom of the housing, the legs having a swivel wheel and a peg;
wherein the grill is movable on the swivel wheels;
wherein the peg is extendable preventing movement of the grill.

18. The grill system of claim 14, further comprising a second grate and a second heat source inside of the housing, the second grate is adjacent to the grate and the second heat source is below the second grate.

19. The grill system of claim 14, further comprising a charcoal starter;
wherein the heat source is supplied from the charcoal starter.

* * * * *